UNITED STATES PATENT OFFICE.

JOHN CLAYTON BACKUS, OF SMETHPORT, PENNSYLVANIA.

GEAR-SHIFTING MECHANISM FOR MOTOR-VEHICLES.

1,258,521.     Specification of Letters Patent.     Patented Mar. 5, 1918.

Application filed October 1, 1914. Serial No. 864,455.

*To all whom it may concern:*

Be it known that I, JOHN CLAYTON BACKUS, a citizen of the United States, residing at Smethport, in the county of McKean and State of Pennsylvania, have invented certain new and useful Improvements in Gear-Shifting Mechanism for Motor-Vehicles, of which the following is a specification.

My invention relates to new and useful improvements in control mechanisms for transmission gears of the selective type, the primary object of my invention being the provision of a gear shifting mechanism or control mechanism consisting of two essential parts, namely, a selective mechanism, by means of which the gear to be shifted is first selected, and a shifting mechanism proper which may be operated to subsequently shift the gear previously selected.

In my present invention, I aim to overcome the difficulties and defects common to the usual gear shifting mechanisms by providing a control mechanism of such a nature that it may be operated by means of a small selector lever located near the steering wheel and proper manipulation of the clutch pedal. As a result, the operator may always have one hand upon the steering wheel while the other hand operates the throttle valve lever and while his feet operate the clutch and service brake pedals. If the operator prefers, however, he may have both hands upon the steering wheel, one foot upon the clutch pedal, and operate the throttle valve by the throttle pedal.

More specifically, the primary object of this invention is the provision of a mechanical means for selecting the gear to be shifted, such means operating in conjunction with a clutch pedal actuated means for shifting the gear selected.

A further object of my invention is the provision of a selector mechanism of such a type that it may be operated at any time in advance of the actual shifting of the gears, that is, in anticipation of a necessary gear shift, leaving the actual shifting of the gears to be later accomplished by the mere throwing out and letting in of the clutch pedal itself.

A still further advantage obtained by my invention is the provision of a selector mechanism which, while located immediately adjacent the transmission mechanism proper, is operable by a small control lever which may be located at any desired point, preferably adjacent the steering wheel of the vehicle.

Again, I accomplish a still further object by constructing the selector mechanism in such a manner that it may be set to move the gears into any desired speed position at any time, this selector mechanism operating irrespective of the positions which the gears may occupy or the direction or speed at which the vehicle may be traveling, at the time the selection is made. This of course is made possible, due to the fact that the gears of the transmission themselves are moved only upon movement of the clutch pedal.

A still further object, in connection with the above objects, is the provision of a mechanism so constructed that a movement of the clutch pedal to inactive position will, under all circumstances, shift the gears of the transmission mechanism to neutral position, and further so constructed that a movement of the clutch pedal to active position will move the gears of the transmission mechanism to whatever position is indicated or provided for by the setting of the selector mechanism. Because of this construction, the driver may anticipate any change of gears which may be necessary and set the selector mechanism for such a change at any desired time before the necessity for the change arises. When the selector mechanism is so set, the gear change proper may be made at any time by merely throwing out and then again letting in the clutch through manipulation of the clutch pedal in the usual manner.

A still further object of my invention is to construct the control mechanism, particularly the selector mechanism, in such a manner as to render it proof against improper manipulations by the driver, the arrangement being such that whenever the clutch is completely out and the gears, therefore, in neutral position, the selector mechanism will be locked, preventing the selecting of any gear while the clutch is out.

A further object of the invention is to construct both the selector mechanism and the gear shifting mechanism in such a manner that no springs or like devices will be required, other than the usual clutch spring, every movement, as a result, being a positive mechanical movement.

A still further object of my invention, in connection with the construction of a control mechanism in which the gears are shifted by manipulation of the clutch pedal, is the provision of a mechanism so arranged as to absolutely insure the moving of the gears either into or out of mesh with coacting gears at exactly the proper time, the determining of the time at which such action should take place not being left to the discretion of the driver, as is now commonly the case.

Still another object of my invention is the simplifying of mechanisms of this character to provide a transmission control which shall be small, compact, inexpensive to manufacture and install, and light in weight.

With these and other objects in view, my invention will be more fully described, illustrated in the accompanying drawings, and then more specifically pointed out in the claims which are attached to and form a part of this application.

In the drawings.

Corresponding and like parts are referred to in the following description and indicated in all the views of the drawings by the same reference characters.

In order to insure a clear and accurate understanding of my invention and its application I have illustrated it in connection with certain portions of a conventional form of motor vehicle including the engine A, the clutch B operated by the clutch pedal C, the shaft D extending from the clutch into the transmission housing E and the steering column F having the usual steering wheel G. It will of course be understood that the illustration of the above described parts is really merely diagrammatic, inasmuch as all or any one of the parts may be of any usual or desired type. The transmission gearing inclosed in the transmission housing E should, however, be of the sliding gear selective type, most commonly employed. In sliding gear mechanisms of the selective type, the gear changes are, as a rule, accomplished by reciprocation of one or the other of a pair of gear shifting rods having yokes or other means operatively engaging the gears to be shifted. As transmission gears of this type are common, any detailed description or any illustration, other than the conventional showing of the transmission housing, is believed to be unnecessary. It should, however, be borne in mind that one of these gear shifting rods controls the low speed and reverse gears, while the other controls the intermediate and high speed gears, particular reference being had to a conventional four-speed transmission. These gear shifting rods normally occupy an intermediate or neutral position and movement of either rod in either direction will cause a certain predetermined shifting of the gears.

My present invention consists in the provision of a selector mechanism having operative connection with these gear shifter rods and with the clutch pedal in such a manner that movement of the clutch pedal, to inactive position will, unless the transmission gears are in neutral position, move one or the other of the shifter rods to bring the transmission gears to such position, while movement of the clutch pedal to active position will move one or the other of the gear shifting rods to bring the gears of the transmission into any speed setting for which the selector mechanism is set. My invention further consists in providing a simple, effective and easily operated mechanism for controlling and setting the selector mechanism.

As the shifting of the gears of the transmission mechanism is dependent upon the setting of the selector mechanism, the setting of which is, in turn, dependent upon the operation of the control mechanism for the selector mechanism, I will first describe such control mechanism. Reference will, therefore, be had particularly to Figs. 1 to 3 inclusive of the drawings, in which 10 indicates the tubular housing or casing which is preferably located adjacent to and parallel with the steering column F, terminating at its upper end in an enlarged head 11 adjacent the steering wheel G. That side of the head 11 opposite the steering column F, is provided with an arcuate, lateral extension 12, the outer face of which is formed with an H-shaped slot 14 corresponding to the usual H-shaped slot common to control mechanisms of most transmission gearings, but upon a considerably smaller scale.

Figures 1, 2, 3:
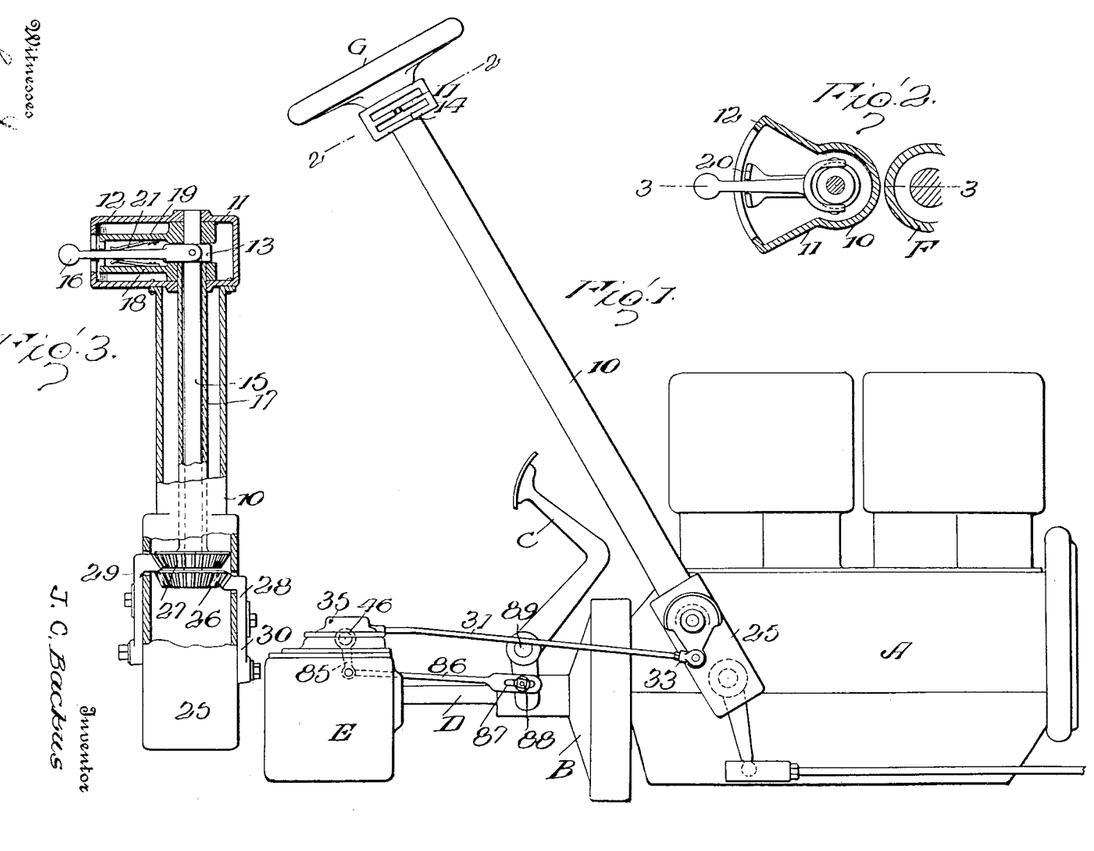
Figure 1 is a fragmentary side elevation of the power plant and transmission of a conventional motor vehicle, together with the steering column thereof.
Fig. 2 is a transverse sectional view taken on the line 2—2 of Fig. 1.
Fig. 3 is a fragmentary front elevational view of the control column mounted adjacent the steering column, this structure being shown partially in section upon the line 3—3 of Fig. 2.

Revolubly mounted within the housing 10 and extending longitudinally thereof, is a shaft 15 and surrounding this shaft is a second tubular shaft or sleeve 17 terminating at its upper end slightly below the lower edge of the upper arm of the slot 14. A collar 13 is freely mounted upon the shaft 15 immediately above the sleeve 17 and a hand lever 16 is provided at one end with a forked terminal to straddle this collar to which it is pivotally connected for vertical swinging movement, the free end of this lever extending through the H slot of the head 11. An arm 18 is keyed or otherwise secured to the upper end of the sleeve 17 and a similar arm 19 correspondingly secured to the shaft 15 above the collar 13. The free ends of the arms extend to points adjacent the slotted face of the head 11 and are provided with inturned flanges 20 each of which is notched to receive the intermediate portion of the hand lever 16. Springs 21 are secured to the arms 18 and 19 adjacent their point of connection to the shafts and at their free ends bear against the intermediate portion of the hand lever 16 to normally hold it out of engagement with either of the arms, that is, in the cross portion of the H slot. This hand or control lever 16 may therefore be swung upwardly to engage in the notch of the arm 19 and then forwardly or rearwardly to turn such arm, and consequently the shaft 15. It may also be swung downwardly to engage in the slot of the arm 18 and then forwardly or rearwardly to correspondingly turn the tubular shaft 17, the normal position of the control lever being in the cross portion of the H slot, and consequently out of engagement with both of the above arms. It will therefore be clear that I have provided a construction by means of which a single, hand operable control lever may be made to independently and selectively turn either one of two concentric shafts 15 and 17 in either direction.

The lower end of the tubular casing 10 terminates in an enlarged housing 25 into which the ends of the shafts 15 and 17 project, the shafts within this housing carrying beveled gears 26 and 27, respectively, these beveled gears being of equal size. Mounted upon the sides of the housing 25 are segment gears 28 and 29 also of equal size and meshing with the beveled gears 26 and 27, respectively. Each segment gear is provided with an extended arm 30 projecting beyond its pivotal point and selector rods 31 and 32 are connected to these arms, the connection being adjustable as shown at 33. These selector rods 31 and 32 extend in parallel spaced relation, their rear ends being reciprocally mounted in the front and rear walls of the cover plate 34 of the housing 35 for the selector mechanism, this housing being located directly upon the transmission housing E and including the body portion 36 and cover plate previously described, each having flanges 37 to receive bolts or other fastening devices by means of which the parts of the housing may be secured together. This housing is preferably rectangular in general form and the selector rods are supported in thickened or bossed portions 38 formed in its walls. Each of the selector rods, where it passes through one of these thickened portions, is frictionally held in any one of its three positions, which positions will be later described, by means of a spring pressed detent 39 adjustable by a set screw 40 and adapted to engage in one or the other of a plurality of notches 41, 42 and 43 formed in spaced relation to each other in the selector rod. Each selector rod, interiorly of the casing, is provided with a downwardly depending bifurcated finger 44, for a purpose which will be hereinafter explained.

The selector mechanism proper, which I will now describe, is inclosed in the housing 35 and primarily includes a selector member for each transmission speed, an actuating member for each selector member, the selector members being coupled in pairs, as will be later explained, and a shifter member for each pair of selectors, co-acting with the corresponding pair of actuating members and operatively connected to one of the shifter rods of the transmission proper.

More specifically, the abutting edge portions of the upper and lower members 34 and 35 of the housing are provided with openings to receive bushings or bearings 45 in which are journaled the spaced parallel shafts 46 and 47, these shafts extending transversely of the housing or at right angles to the selector rods 31 and 32. Spur gears 48 and 49 are keyed or otherwise secured to the shafts 46 and 47, respectively, and mesh with each other in such a manner that turning of either shaft in one direction will cause a corresponding turning of the other shaft in the opposite direction, the spur gears being of equal diameters and having an equal number of teeth.

The shafts 46 and 47 carry a pair of co-acting selector members indicated as a whole by the numerals 50 and 51, respectively, these selector members being located adjacent the spur gears of their respective shafts and such shafts further carry a second pair of co-acting selector members 52 and 53 located adjacent the opposite wall of the housing and disposed oppositely to the first. Each of these selector members includes a body portion 54 substantially cylindrical in shape and loosely and concentrically mounted upon its shaft, having its inner face recessed to provide an annular seat about the shaft and a resultant annular ring or shoulder 55, the rings or shoulders of the body members of the selectors upon either shaft extending toward each other or inwardly of the housing, as clearly shown in Figs. 5 and 6 of the drawings. Hereafter, for the sake of convenience, these rings or shoulders 55 will be termed selector rings.

The selector rings of the selector members 50, 51, 52 and 53 are provided with cam slots 56, 57, 58 and 59, respectively. Each of these cam slots includes peripherally and transversely spaced parallel end portions $a$ and $b$ connected by a diagonally disposed intermediate portion $c$, the three portions, above described, forming a single continuous slot having an intermediate cam portion. Each selector member further includes a second cylindrical body portion 60 loosely mounted upon one or the other of the shafts and seating in the annular recess in the inner face of the first body member, as clearly shown in Figs. 5 and 6 of the drawings. Each of these second body members 60 is provided adjacent its peripheral edge with a cylindrical recess or socket 61 formed in its exposed face and parallel to the shaft upon which such body member is mounted. The peripheral face of each of such body members is further provided with a slot 62 extending parallel to the corresponding recess 61 and communicating throughout its length with such recess. Selector plungers 63, 64, 65 and 66 are slidably disposed in the socket 61 of the members 60 of the selectors 50, 51, 52 and 53, respectively, being so proportioned that when in withdrawn position their outer ends lie flush with the outer or exposed faces of the members 60. Pins 67 extend radially from the inner end portions of each of the plungers through the corresponding slots 62 of the body members 60 and through the corresponding cam slots of the body members 54.

Each of the selector members 60, diametrically opposite its socket 61, has formed upon its outer or exposed face an arcuate, peripheral lip or flange 68, the outer curved face of which is cut-away to provide a series of gear teeth 69. Furthermore, each of the body members 54 is provided upon its outer face, and preferably in vertical alinement above the shaft upon which it is mounted, with a pin 70. A link 71 has its ends pivotally secured to the pins of the selector members 50 and 51, while a similar link 72 has its ends pivotally connected to the pins 70 of the selectors 52 and 53. By this means, it will be apparent that the selectors 50 and 51 are coupled to turn about their respective shafts in unison, as are also the selectors 52 and 53, both selectors, under these circumstances, turning in the same direction. The bifurcated fingers 44 of the selector rods 31 and 32 each straddle one of the pins 70, the former straddling the pin of the selector 53, while the latter straddles the pin of the selector 51. It will, therefore, be clear that reciprocation of the selector rod 31 will cause simultaneous turning of the selectors 52 and 53, while reciprocation of the selector rod 32 will cause similar turning of the selectors 50 and 51.

The bottom of the housing 35 is provided with a longitudinal depression 73 formed intermediate its length with a slot 74 and rack bars 75 and 76 are mounted for reciprocation longitudinally of this depression, their ends extending through alined openings 77 formed in the front and rear walls of the housing. These rack bars are provided intermediate their length with downwardly extending fingers or arms 78 which project through the slot 74 and through a slot formed in the top of the transmission housing E, for connection with the shifter rods of the transmission mechanism.

Figure 4:
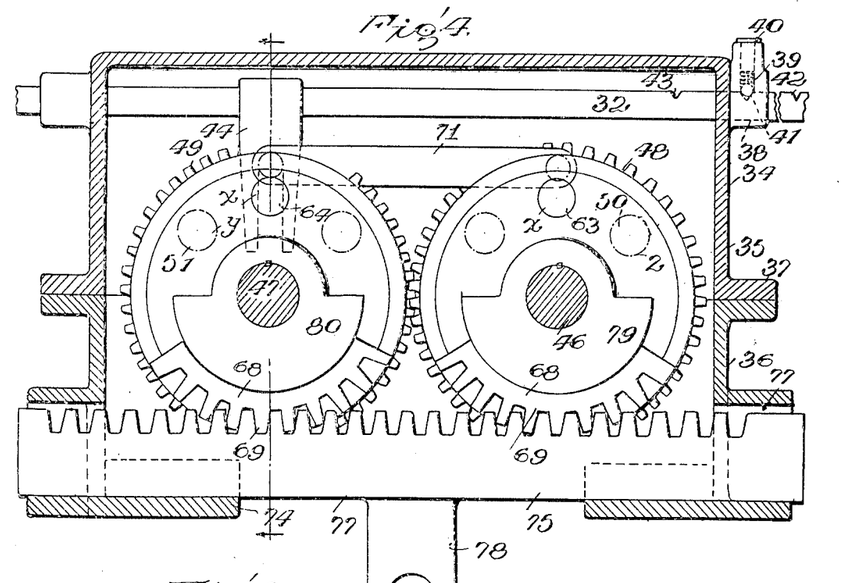
Fig. 4 is a vertical sectional view taken on the line 4—4 of Fig. 6.
Figure 5:
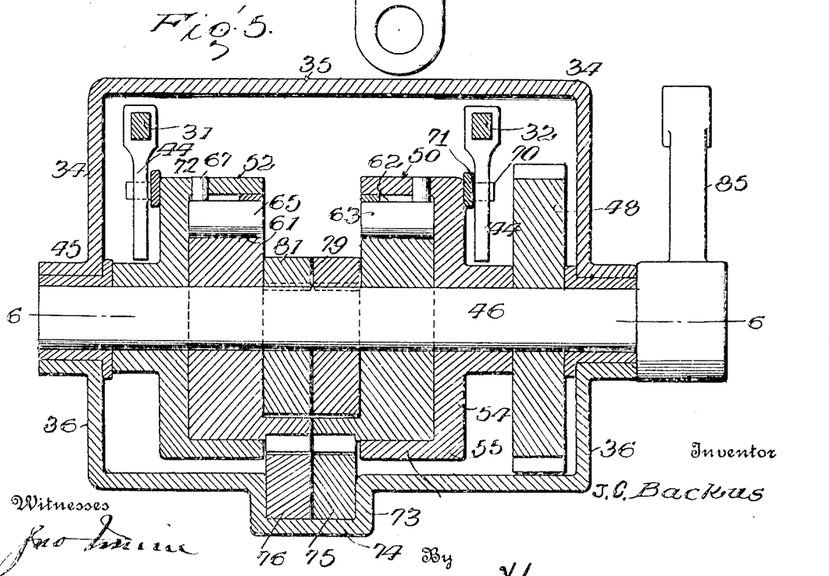
Fig. 5 is a vertical sectional view taken on the line 5—5 of Fig. 4.
Figure 6:
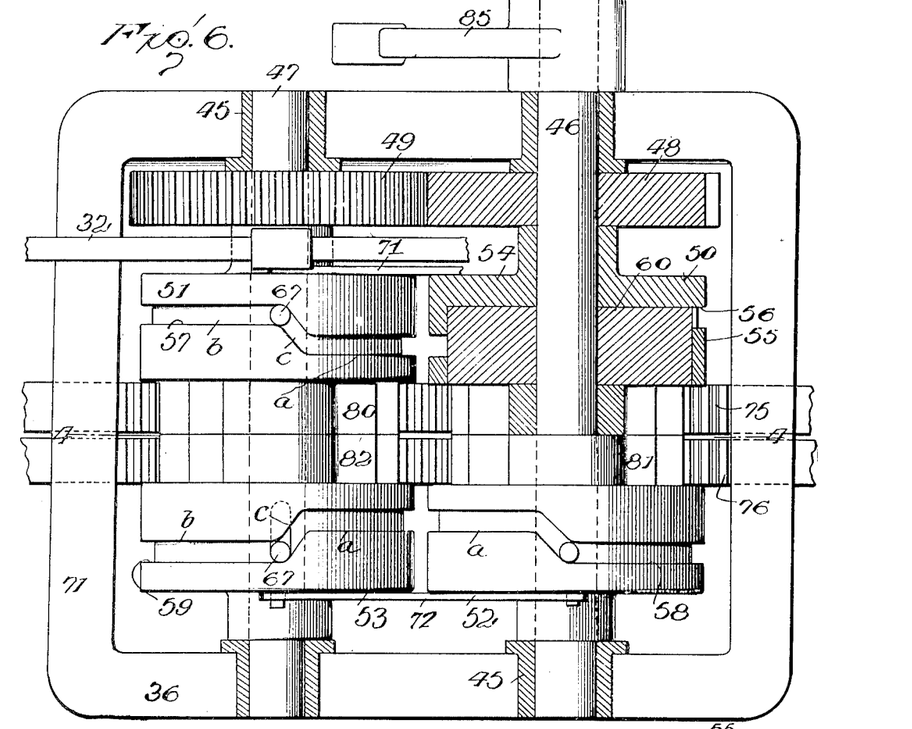
Fig. 6 is a horizontal sectional view taken on the line 6—6 of Fig. 5, a portion of the structure inclosed in the casing being shown in elevation, while the remainder is shown in section.
Figure 7:
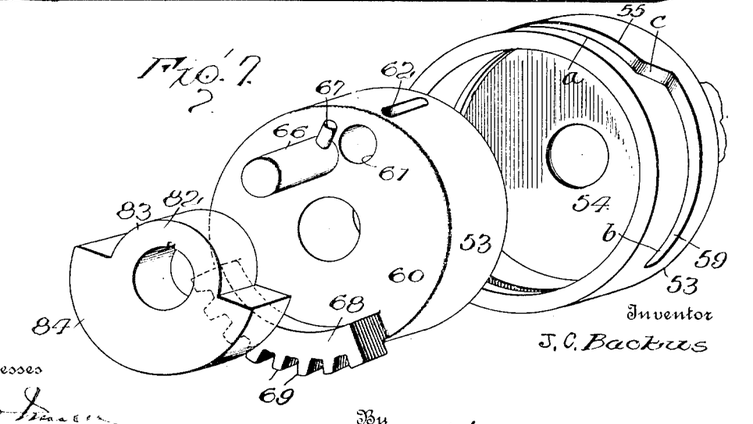
Fig. 7 is an unassembled perspective view of certain portions of the selector mechanism.

Actuating members 79, 80, 81 and 82 are keyed upon the shafts 46 and 47, as shown in Fig. 6, the actuating members 79 and 81 being keyed upon the shaft 46 adjacent the selectors 50 and 52, while the actuating members 80 and 82 are keyed upon the shaft 47 adjacent the selectors 51 and 53. Each of these actuating members, as best shown in Fig. 7 of the drawings, includes a hub portion 83 provided with a radially extending semi-cylindrical projection or operating portion 84, such projection or extension being adapted to engage within the arcuate lip or flange 68 and being proportioned in such a manner that its radial edges will, when the actuating member is swung, engage against the plunger of the corresponding selector, if such plunger is extended. These actuating members, as best shown in Figs. 4 and 5 of the drawings, are so keyed upon the shaft that, in normal conditions, their extended portions are located diametrically opposite the plungers requiring a turning movement of substantially 90 degrees before they are brought into engagement with the plungers if the selectors are in normal position.

One end of one of the shafts, in the present instance the shaft 46, is extended beyond the housing and carries a crank arm 85. A link 86 is pivotally connected at one end to the free end of this crank arm and is provided at its opposite end with a slotted head 87 to receive a pivotal connection 88 carried by the lower free end of the clutch pedal lever C, such lever being pivoted intermediate its length as shown at 89. This slot connection should be such as to preferably permit about a one-fifth movement of the clutch pedal without operating the link 86 and the clutch and pedal should be so arranged that this movement will be sufficient to release the clutch, if desired. Furthermore, the amount of clutch pedal movement should be such that in addition to its free movement independent of the link 86 it should, when thrown the full distance, turn the crank arm 85 through an angle of substantially 135 degrees.

At this point, for reasons which will be apparent upon taking up the description of the operation of my selective mechanism for transmission gearing, particular reference should be had to the formation of the slots 56, 57, 58 and 59 of the selector rings, it being noted that the portions *a* of all of these rings are disposed adjacent each other and adjacent the free edges of the rings, while the portions *b* are disposed adjacent the front and rear walls of the housing and away from the free edges of the rings, the intermediate portions *c* of the slots being, under normal conditions, disposed vertically above the shafts 46 and 47 carrying the selectors, this arrangement being clearly shown in Fig. 6 of the drawings. It should further be noted that the portions *a* and *b* are of equal length and each equal in length to the total movement of the pins 67 as caused by turning of the shafts 46 and 47 through a full movement of the clutch pedal.

Having thus described the construction of my control mechanism for transmission gears, I will now describe its operation, assuming that the control mechanism and transmission gears are in neutral position, that is, that the control mechanism is in the position shown in the drawings. Under these circumstances, if the control lever 16 is swung upwardly into the upper arm of the H-slot and then rearwardly to its full extent, the shaft 15 will be turned in such a direction as to force the selector rod 32 rearwardly until its detent seats in the notch 42. This movement of the selector rod 32 acts through its finger 44 to turn the selector member 54 or selector ring of the selector 51 in a counterclockwise direction, the corresponding member of the selector 50 also turning in the same direction and to the same extent, due to the connecting link 71. The selector members 60 of the two selectors 51 and 50, however, remain stationary due to the meshing of their arcuate racks 69 with the rack 75. Because of this, the plunger 64 is forced outwardly into the path of the actuating member 80 by the cam portion *c* of the slot 57, while the plunger 63 remains in retracted position, moving in the arm *b* of its controlling slot. Both the plungers 63 and 64 still occupy the position shown in full lines at *x* in Fig. 4. When the selector has been so set, the clutch is thrown out in the usual manner, this movement of the clutch forcing the link 86 rearwardly to turn the shaft 46 in a clockwise and the shaft 47 in a counterclockwise direction. The turning of these shafts in this manner, causes corresponding turning of the actuating members carried by them, the result being that the actuating member 80 engages the extended plunger 64 of the selector 51, swinging it to the position shown in dotted lines at *y* in Fig. 4, at which point its pin passes through the cam portion *c* of the slot 57 and the plunger is retracted. This turning of the selector member 60 of the selector 51 results in a forward movement of the gear shifting rack 75, and consequently, through the connection of such rack with the gear shifter rod of the transmission gearing, moves the gears of the transmission into low speed position. The clutch is now let in gently, in the usual manner, the actuating members 79 and 80 returning to normal position, which is the position shown in Fig. 4.

To bring the transmission gearing into intermediate speed, the control lever 16 is swung forwardly in the upper arm of the H-slot, then downwardly through the cross slot and forwardly to the extreme forward end of the lower arm of the H-slot. The first half of this movement, namely, the movement to the cross portion of the H-slot, moves the selector rod 32 in the opposite direction until its detent again seats in the notch 41, this movement of the selector rod 32 causing the plunger 63 to be extended by its controlling cam slot 56 without affecting the plunger 64. The second half of this movement, that is, that portion of the movement in the lower arm of the H-slot, causes rotation of the shaft 17 and consequent reciprocation of the selector rod 31 rearwardly until its detent seats in its notch 42. This movement of the selector rod 31 causes simultaneous turning of the selector rings of the selectors 52 and 53 in a counterclockwise direction, resulting in the projection of the plunger 66 of the selector 53. When the control mechanism has been thus set, the engine is first speeded up slightly by wider opening of the throttle and then its speed cut down and the clutch thrown out and then gradually let in again, after which the engine is again speeded up. The throwing out of the clutch causes the actuating members 79 and 81 to revolve in a counterclockwise direction and the actuating members 80 and 82 to revolve in a clockwise direction. Under these circumstances, the actuating member 79 engages the extended plunger 63, which is located in the position indicated at *y* to move it to the position *x*, at which point it is retracted by its cam slot 56. This movement of the plunger 63 causes a turning of the body member 60 of the selector member 50 such as to move the gear shifting rack 75 rearwardly to its original position which, of course, not only brings the gears of the transmission mechanism into neutral position, but which also acts upon the member 60 of the selector member 51 to return its plunger 64 to its original position, indicated at $x$ in full lines upon Fig. 4. This same movement of the clutch also causes the actuating member 82 to engage the plunger 66, and consequently move the rack bar 76 forwardly to bring the intermediate gears of the transmission mechanism into mesh, the plunger 66 being withdrawn by its cam slot 59 when it has reached such a position.

At this point it should be noted that in all cases, the movement of the actuating members, for a complete movement of the clutch, is substantially 135 degrees. The first fifth of this movement brings that actuating member which is to unmesh the gears into active position, the next two-fifths movement causes such actuating member to unmesh the gears and brings that actuating member which is to move the gears into mesh into active position, and the last two-fifths of the movement causes the latter actuating member to move the gears into mesh. For this reason, the moving out of mesh of one set of gears and the moving into mesh of another set, occurs successively, it being mechanically impossible, no matter how carelessly the control mechanism is manipulated, to bring one set of gears into mesh while another set is still in mesh.

Having thrown the transmission mechanism into intermediate speed, in the above described manner, it can then be moved into high speed by moving the control lever 24 rearwardly to the extreme rear end of the lower arm of the H-slot, such movement reciprocating the selector rod 31 until its detent seats in its notch 43. This movement of the selector rod 31 causes an extension of the plunger 65 of the selector 52 in such a manner that upon throwing out the clutch, the actuating member 81 engages the plunger to move the selector member 52 back to normal position, at which time its plunger is withdrawn by its cam slot 58, this resulting in unmeshing the intermediate gears of the transmission mechanism. This movement of the clutch to inactive position also, through turning of the selector member 53, causes an extension of the plunger 66 so that during the last two fifths movement of the clutch, the rack 76 is actuated in the opposite direction to throw the gears of the transmission mechanism into high speed position. It will be understood that the throttle is controlled in the usual manner during this shift from an intermediate to a high speed.

In order to bring the gears into neutral position to permit stopping of the car, the selector lever 24 is moved into the cross portion of the H-slot or gate, that is, to the position shown in Fig. 1 and as the high speed gear is now in, this movement will cause the plunger 66 to be again extended. Throwing out of the clutch will, therefore, cause the actuating member 82 to engage the plunger 66 and return its selector member 53 to normal position, at which point, the plunger 66 is again withdrawn. All of the selector mechanisms are now located in neutral position and as none of the plungers have been extended by moving the selector lever to neutral position, the letting in of the clutch will not affect the transmission gearing. It will of course be clear that the transmission gearing may be brought back to neutral position from any of the other gear settings previously described in identically the same manner, that is, by merely swinging the control or selector lever to neutral position and throwing out the clutch.

To bring the transmission gearing into reverse speed drive, the selector lever is moved to the extreme forward end of the upper arm of the H-slot, this moving the selector rod 32 until its detent seats in its notch 43, the result being that the plunger 63 is extended into the path of the actuating member 79 so that upon throwing out of the clutch to its full extent, such actuating member will engage the plunger 63 and move it to the position $z$, bringing the gears into reverse position, the plunger being withdrawn by its cam slot upon reaching such position.

It should be noted that no plungers can be extended, unless the actuating members are in position to operate them, that is, when the clutch is thrown out, the actuating members will be in the path of all plungers and therefore prevent them from being extended. This makes the control mechanism fool proof as there is no wrong way of working it. Furthermore, the operator can select any desired gear without relation to any other gear and may vary this selection as many times as desired, prior to the throwing out of the clutch.

Inasmuch as the actual shifting of the gears, being controlled by the clutch, is performed at exactly the proper time, that is, between the pull of the engine and the push of the car, the power required for such shifting is practically negligible, in fact, being so slight that the operator cannot realize that any more force is being applied to the clutch pedal than would ordinarily be necessary to release the clutch. The control mechanism described is simple, has been found to be thoroughly effective in practice, and is not liable to get out of order inasmuch as no springs and other devices of a similar nature are employed.

Although I have illustrated and described my invention in all its details of construction, it will of course be understood that I do not wish to be limited to such details as various minor changes, within the scope of the appended claims, may be made at any time, without in the slightest degree departing from the spirit of my invention.

Having thus described the invention, what is claimed as new is:

1. In a gear shifting mechanism, members mounted for reciprocation adapted for operative attachment to the gear shifting members of a transmission gearing, means for reciprocating said members, and means for selectively determining which member shall be reciprocated and in which direction it shall be moved, said means including a plurality of selector members, each being adapted to move one of the reciprocating members, means for selectively rendering any one of the selectors active, and a plurality of actuating members, each adapted to co-act with one of the selector members when the latter has been rendered active.

2. In a gear shifting mechanism, a plurality of selector mechanisms, means adapted for attachment to the shifter rods of a transmission gearing and operable by the selector mechanisms, selector rods operatively engaging the selector mechanisms to move them in and out of active condition, and means for moving the selector rods to predetermined positions, said means including a housing, concentric shafts located in the housing, a common control lever mounted to independently and selectively turn either shaft in either direction, and operative connection between each shaft and one of the selector rods.

3. In a gear shifting mechanism, spaced shafts, means co-acting between the shafts whereby turning of one will turn the other in the opposite direction, selector mechanisms loosely mounted on the shafts and including extensible plungers, means for selectively actuating the selector mechanisms to extend or retract their plungers, shifter elements adapted to be actuated by rotation of the selector members, and actuating members movable to rotate the selector members through engagement with their plungers.

4. In a gear shifting mechanism, spaced shafts, means co-acting between the shafts whereby turning of one will turn the other in the opposite direction, selector mechanisms loosely mounted on the shafts and including extensible plungers, means for selectively actuating the selector mechanisms to extend or retract their plungers, shifter elements adapted to be actuated by rotation of the selector members, actuating members movable to rotate the selector members through engagement with their plungers, and means for simultaneously moving all of the actuating members.

5. In a gear shifting mechanism, spaced shafts, means co-acting between the shafts whereby turning of one will turn the other in the opposite direction, selector mechanisms loosely mounted on the shafts and including extensible plungers, means for selectively actuating the selector mechanisms to extend or retract their plungers, shifter elements adapted to be actuated by rotation of the selector members, actuating members movable to rotate the selector members through engagement with their plungers, and means for simultaneously rotating all of the actuating members, first in one direction and then in the other.

6. In a gear shifting mechanism, a pair of rotatable shafts, meshing spur gears carried by the shafts, a plurality of selector rings loosely mounted about the shafts and provided with peripheral cam slots, selector members mounted for turning movement in the rings and provided with gear teeth, plungers reciprocally mounted one in each of the selector members and movable to extend therebeyond, pins carried by the plungers and extending through the cam slots of the rings, whereby turning of the rings independent of the selector members will advance or retract the plungers, actuating members fixed to the shafts, one adjacent each of the selector members and movable by rotation of the shaft to engage the plungers when the latter are extended, means for rotating one of the shafts, and racks co-acting with the gears of the selector members and adapted for operative connection with the gear shifting mechanism of a transmission gearing.

7. In a gear shifting mechanism, a pair of rotatable shafts, meshing spur gears carried by the shafts, a plurality of selector rings loosely mounted about the shafts and provided with peripheral cam slots, selector members mounted for turning movement in the rings and provided with gear teeth, plungers reciprocally mounted, one in each of the selector members and movable to extend therebeyond, pins carried by the plungers and extending through the cam slots of the rings, whereby turning of the rings independent of the selector members will advance or retract the plungers, actuating members fixed to the shafts, one adjacent each of the selector members and movable by rotation of the shaft to engage the plungers when the latter are extended, means for rotating one of the shafts, racks co-acting with the gears of the selector members and adapted for operative connection with the gear shifting mechanism of a transmission gearing, and means for selectively rotating certain of the rings to advance or retract the plungers.

8. In a gear shifting mechanism, a pair of rotatable shafts, meshing spur gears carried by the shafts, a plurality of selector rings loosely mounted about the shafts and provided with peripheral cam slots, selector members mounted for turning movement in the rings and provided with gear teeth, plungers reciprocally mounted one in each of the selector members and movable to extend therebeyond, pins carried by the plungers and extending through the cam slots of the rings, whereby turning of the rings independent of the selector members will advance or retract the plungers, actuating members fixed to the shafts, one adjacent each of the selector members and movable by rotation of the shafts to engage the plungers when the latter are extended, means for rotating one of the shafts, racks co-acting with the gears of the selector members and adapted for operative connection with the gear shifting mechanism of a transmission gearing, and means for selectively rotating certain of the rings to advance or retract the plungers, said means being operable by a single control lever.

9. In a gear shifting mechanism, a pair of shafts, means for rotating the shafts in opposite directions, a selector mechanism freely mounted on each shaft, means for selectively turning such selector mechanisms in either direction, connecting means between such mechanisms whereby they turn simultaneously and in the same direction at all times, plungers extensible by turning of the selector members, means adapted to turn with the shafts to engage such plunger as is extended, and means adapted for operative attachment to a transmission gearing mechanism and operable by turning of either selector mechanism by engagement of an actuating mechanism with its plunger.

10. In a gear shifting mechanism, a pair of shafts, operative connection between the shafts to cause them to turn in opposite directions, actuating members fixed on the shafts to turn therewith, reciprocating elements adapted for operative attachment to the shifter rods of a transmission gearing, and selector members carried loosely upon the shafts and movable into and out of operative engagement with the actuating members, said selector members operatively engaging the reciprocating members.

11. In a gear shifting mechanism, a pair of shafts, operative connection between the shafts to cause them to turn in opposite directions, actuating members fixed on the shafts to turn therewith, reciprocating elements adapted for operative attachment to the shifter rods of a transmission gearing, and selector members carried loosely upon the shafts and movable into and out of operative engagement with the actuating members, said selector members operatively engaging the reciprocating members and each including a member revoluble about the shafts, a pin extending through the peripheral face of the member from the plunger, and a ring mounted for turning movement about the plunger carrying member and provided with a cam slot through which the pin extends.

12. In a gear shifting mechanism, a pair of shafts, operative connection between the shafts to cause them to turn in opposite directions, actuating members fixed on the shafts to turn therewith, reciprocating elements adapted for operative attachment to the shifter rods of a transmission gearing, and selector members carried loosely upon the shafts and movable into and out of operative engagement with the actuating members, said selector members operatively engaging the reciprocating members and each including a member revoluble about the shafts, a pin extending through the peripheral face of the member from the plunger, a ring mounted for turning movement about the plunger carrying member and provided with a cam slot through which the pin extends, and a link connecting the rings of the selector members.

13. In a gear shifting mechanism, the combination with a member adapted for operative connection with a gear shifter rod of a transmission gearing, of shafts, means for rotating the shafts in opposite directions, actuating members fixed upon the shafts, and selectors freely mounted upon the shafts and linked to each other, said selectors operatively engaging the gear shifter member.

14. In a gear shifting mechanism, the combination with a member adapted for operative connection with a gear shifter rod of a transmission gearing, of shafts, means for rotating the shafts in opposite directions, actuating members fixed upon the shafts, and selectors freely mounted upon the shafts and linked to each other, said selectors operatively engaging the gear shifter member and each including selector rings free for turning movement, a link connecting the rings, said rings being each provided with a peripheral cam slot, body portions freely disposed to turn within the rings and about the shafts and operatively engaging the shifting member, pins extending through the cam slots of the rings and through peripheral slots in the body members, and plungers reciprocally mounted in sockets formed in the body members and connected to the pins, said plungers being extensible into the path of the actuating member.

15. In a gear shifting mechanism, the combination with a member adapted for operative connection with a gear shifter rod of a transmission gearing, of shafts, means for rotating the shafts in opposite directions, actuating members fixed upon the shafts, and selectors freely mounted upon the shafts and linked to each other, said selectors operatively engaging the gear shifter member and each including selector rings free for turning movement, a link connecting the rings, said rings being each provided with a peripheral cam slot, body portions freely disposed to turn within the rings and about the shafts and operatively engaging the shifting member, pins extending through the cam slots of the rings and through peripheral slots in the body members, plungers reciprocally mounted in sockets formed in the body members and connected to the pins, and means for turning the selector rings in either direction to selectively extend either of the plungers.

16. In a gear shifting mechanism, members adapted for attachment to the shifter rods of a transmission gearing, selector members each operable to move one of the first members, actuating members, and plungers retractible into or extensible from the selectors to project in the path of the actuating members.

17. In a gear shifting mechanism, members adapted for attachment to the shifter rods of a transmission gearing, selector members each operable to move one of the first members, actuating members, plungers retractible into or extensible from the selectors to project into the path of the actuating members, and means for selectively extending the plungers.

18. In a gear shifting mechanism, members adapted for attachment to the shifter rods of a transmission gearing, selector members each operable to move one of the first members, actuating members, plungers retractible into or extensible from the selectors to project into the path of the actuating members, and means for selectively extending the plungers, said means including pins extending radially from the plungers, selector rings surrounding the selectors and having peripheral cam slots through which the pins project, and means for turning the selector rings.

19. In a gear shifting mechanism, a pair of rack bars adapted for operative connection to the shifter rods of a transmission gearing, clutch pedal operated means each constantly engaging one rack bar for reciprocating either rack bar in either direction, and means co-acting with such clutch pedal operated means for controlling which rack bar shall be reciprocated and in which direction.

In testimony whereof I affix my signature in presence of two witnesses.

JOHN CLAYTON BACKUS. [L. S.]

Witnesses:
　HELEN L. BURLINGAME,
　OCTAVIA RAGMER.